(12) United States Patent
North

(10) Patent No.: US 6,622,208 B2
(45) Date of Patent: Sep. 16, 2003

(54) SYSTEM AND METHODS USING A SYSTEM-ON-A-CHIP WITH SOFT CACHE

(75) Inventor: Gregory Allen North, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/822,645

(22) Filed: Mar. 30, 2001

(65) Prior Publication Data

US 2003/0046510 A1 Mar. 6, 2003

(51) Int. Cl.[7] .............................................. G06F 12/08
(52) U.S. Cl. ......................... 711/118; 711/3; 711/128; 711/202; 711/203; 711/220; 711/212
(58) Field of Search ................................. 711/118, 202, 711/203, 205, 206, 128, 3, 220, 212

(56) References Cited

U.S. PATENT DOCUMENTS

| | | | | |
|---|---|---|---|---|
| 5,666,480 A | * | 9/1997 | Leung et al. .................. 714/1 |
| 5,778,427 A | * | 7/1998 | Hagersten et al. ........... 711/128 |
| 5,809,562 A | * | 9/1998 | Gaskins et al. .............. 711/207 |
| 5,854,943 A | | 12/1998 | McBride et al. ............... 710/51 |
| 5,857,214 A | | 1/1999 | Dey ............................. 711/212 |
| 5,918,245 A | | 6/1999 | Yung ............................. 711/22 |
| 6,006,312 A | * | 12/1999 | Kohn et al. .................. 711/210 |
| 6,014,732 A | | 1/2000 | Naffziger ..................... 711/203 |
| 6,081,853 A | * | 6/2000 | Gaskins et al. ............... 710/35 |
| 6,122,709 A | | 9/2000 | Wicki et al. ................. 711/118 |
| 6,131,143 A | | 10/2000 | Sakai ........................... 711/128 |
| 6,145,054 A | | 11/2000 | Mehrotra et al. ........... 711/119 |
| 6,223,255 B1 | | 4/2001 | Argade ........................ 711/129 |
| 6,253,285 B1 | * | 6/2001 | Razdan et al. .............. 711/118 |

* cited by examiner

*Primary Examiner*—Reginald G. Bragdon
*Assistant Examiner*—Jasmine Song
(74) *Attorney, Agent, or Firm*—James J. Murphy, Esq.; Winstead Sechrest & Minick, P.C.

(57) ABSTRACT

A soft cache system compares tag bits of a virtual address with tag fields of a plurality of soft cache register entries, each entry associated with an index to a corresponding cache line in virtual memory. A cache line size for the cache line is programmable. When the tag bits of the virtual address match the tag field of one of the soft cache entries, the index from that entry is selected for generating a physical address. The physical address is generated using the selected index as an offset to a corresponding soft cache space in memory.

18 Claims, 8 Drawing Sheets

SYSTEM AND METHODS USING A SYSTEM-ON-A-CHIP WITH SOFT CACHE

CROSS-REFERENCE TO RELATED APPLICATION

The following co-pending and co-assigned application contains related information and is hereby incorporated by reference: Ser. No. 09/821,897 (Attorney Docket No. 1125-CS [2836-P139US]), entitled "A SYSTEM ON A CHIP WITH MULTIPLE POWER PLANES AND ASSOCIATE POWER MANAGEMENT METHODS", by Luo and North, filed Mar. 20, 2001; and Ser. No. 09/822,052 (Attorney Docket No. 1138-EPD [2836-P140US] by Pillay and Rao entitled "CIRCUITS AND METHODS FOR DEBUGGING AN EMBEDDED PROCESSOR AND SYSTEMS USING THE SAME", filed Mar. 30,2001.

BACKGROUND OF THE INVENTION

1. Field of Invention

The present invention relates in general to integrated circuits and in particular, to a system-on-a-chip with soft cache and systems and methods using the same.

2. Background of Invention

Handheld personal electronic appliances have become increasingly popular as new technologies have produced affordable devices with a high degree of functionality. One such device is the portable digital audio player, which downloads digital audio data, stores those data in a read-writeable memory, and converts those data into audio on user demand. The digital data is downloaded from a network or retrieved from a fixed medium, such as a compact disk, in one of several forms, including the MPEG Layer 3, ACC, and MS Audio protocols. An audio decoder, supported by appropriate firmware, retrieves the encoded data from memory, applies the corresponding decoding algorithm and coverts the decoded data into analog form for driving a headset or other portable speaker system.

The use of systems-on-a-chip in the design and construction of handheld digital music players allows all the requisite functionality to be contained in a compact, relatively inexpensive unit. Notwithstanding, the integration of the major functions of a digital music player into a single chip device is not a trivial task. Not only must the device include the processing power capable of performing digital to audio conversion efficiently, it must also be capable of interfacing with various sources of digitally encoded data, support different user I/O options, such as LCD displays and headphones, and operate in conjunction with sufficiently large on-chip and off-chip memory spaces storing (programming code and data) needed to produce high-quality audio.

SUMMARY OF INVENTION

According to the inventive concepts, a cache system is disclosed which compares tag bits of a virtual address with tag fields of a plurality of soft cache register entries, each entry associated with an index to a corresponding cache line in a programmable cache memory space. A cache line size of the cache line is also programmable. When the tag bits of the virtual address match the tag field of one of the soft cache entries, the index from that entry is selected for generating a physical address. The physical address is generated using the selected index as an offset to a corresponding programmable soft cache space in memory address by block address bits from the virtual address.

Systems and software embodying the principles of the present invention advantageously allow software caching in systems with limited or no hardware caching support. An example is the disclosed system-on-a-chip employing an ARM7tdmi CPU core, which has neither a hardware cache nor a memory management unit. Additionally, since cache line replacement is done in software on a cache miss, the interface between memories operating under different protocols has increased efficiency.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–14 of the drawings, in which like numbers designate like parts.

Figure 1:
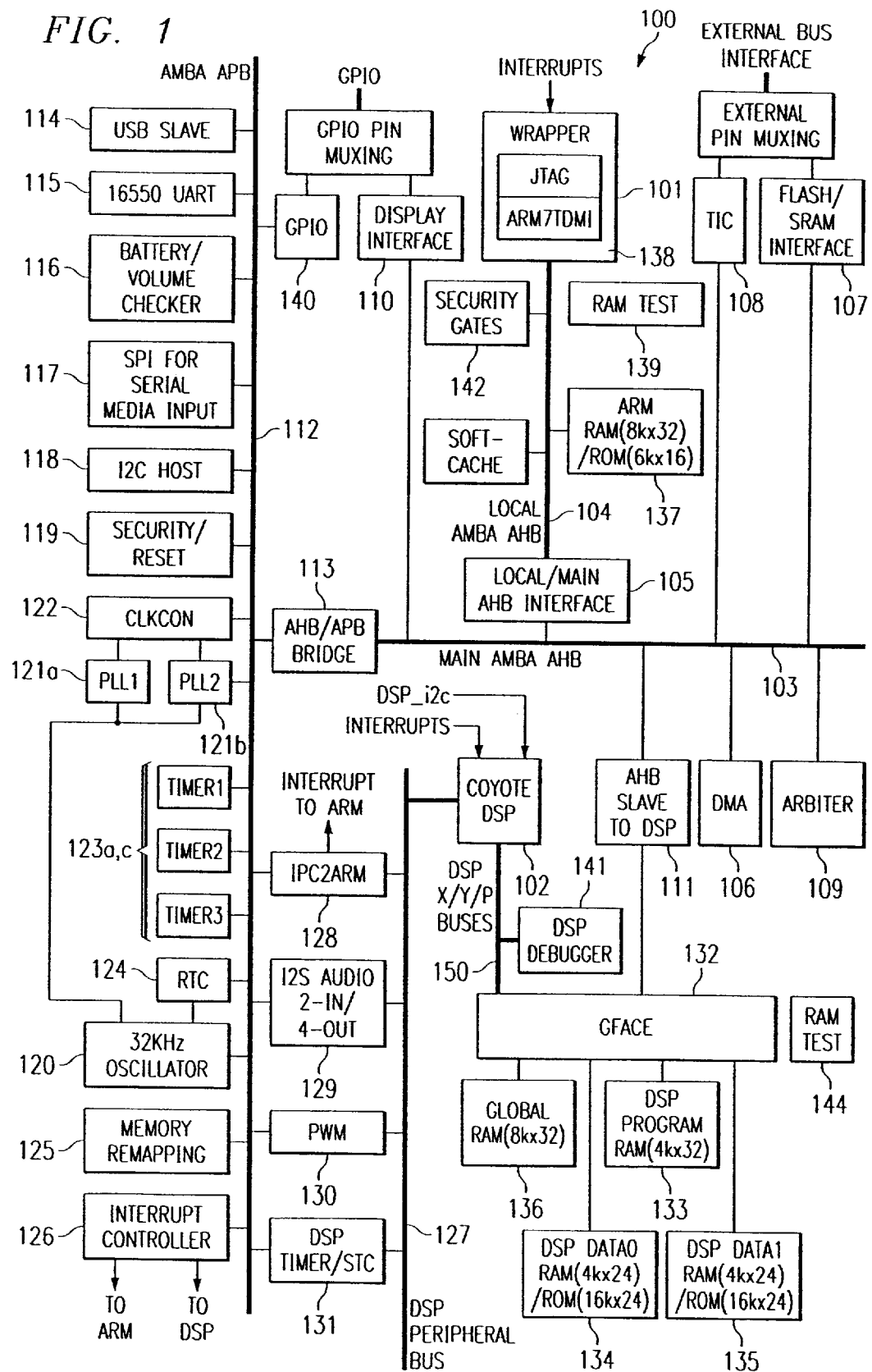
FIG. 1 is a high level functional block diagram of a system-on-a-chip system embodying the principles of the present invention.

FIG. 1 is a high level functional block diagram of a system-on-a-chip system 100 embodying the principles of the present invention. System 100 is based on a microprocessor core, a digital signal processor, a set of peripherals, and associated buses, each of which will be discussed in further detail below. Among the possible applications of system 100 are multi-standard portable audio devices processing digital audio data in such formats as a MP3, ACC, and MS-Audio.

In the preferred embodiment, system 100 includes an ARM7TDMI microprocessor core 101, available from ARM Ltd. Cambridge, United Kingdom. Microprocessor core 101 serves various functions including interfacing the peripherals, packing and unpacking data, and acts as the system master which determines the overall function and state of the chip.

Digital signal processor (DSP) 102 is a computation-intensive engine which takes dispatched data from microprocessor 101 and then decodes and controls the playback of those data through the peripheral ports.

The system bus architecture is based on ARM Advanced Microprocessor Bus Architecture (AMBA) bus system. The specific requirements for the AMBA bus architecture are in accordance with the ARM Ltd. AMBA specification. A main or high-speed bus(AHB) bus 103 is connected to high bandwidth blocks which require more frequent access to the memory. Microprocessor 101 and its local memory (RAM/ROM ) 137 operate from main bus 103 via a local AHB bus 104 and an interface 105 which bridges local AHB bus 104 and main AHB bus 103. This configuration minimizes bus conflicts when microprocessor 101 is running a program and another bus master, for example the DMA engine, is transferring data through main AHB bus 103.

Among the other devices operating directly off main AHB bus 103 are a 4-channel DMA engine 106, and flash/SRAM interface 107, including an external memory controller, which maps up to 512 MByte external memory into the microprocessor memory space as an extension of on-chip memory, a test interface controller (TIC) 108, arbiter 109 and LCD interface 110. Test Interface Controller (TIC) 108 can take over the bus control from microprocessor 101 and mimic the bus cycle in order to stimulate the blocks connected to AHB/APB buses. Arbiter 109 arbitrates bus requests on main bus 103. LCD interface 110 supports connections to various LCD panels (since the display may require a large frame buffer, display controller 110 operates from the high speed bus).

An AHB-DSP interface 111, which is a slave to main bus 103, allows microprocessor 101 to move data block to and from DSP memory.

System 100 also employs an AMBA Advanced Peripheral Bus (APB) 112 which links to the system low band-width peripherals. APB 112 operates from main bus 103 through AHB/APB bridge 113, which is also a slave to main bus 103. In the illustrated embodiment, all peripherals interfacing with system-external devices operate from APB bus 112.

The peripherals operating from APB bus 112 include a USB slave interface 114 which supports communications between system 100 and a personal computer (PC)or similar device. When system 100 is used in a portable digital music appliance, this interface enables the quick downloading files from the PC to the portable audio system. UARTa115 is a serial port is fully 16550 compatible and supports various baud rates. It also provides a legacy communication channel to an associated PC.

Battery/Volume Checker 116 is an on-chip analog-to-digital convertor (ADC) which takes two analog inputs and provides a digital signal with 8-bit precision at up to a 100 Hz sample rate for use in battery level monitoring and volume switch checking.

An SPI port 117 also operates from APB bus 112 for use with various serial storage media such as Multi-Media Card (MMC). A master mode compatibleaI2C port 118 provides another common serial interface to a range of devices such as EEPROM, DAC/Codecs and some displays.

Security/Reset port 119 operates in conjunction with security code in ROM to determine the appropriate chip initialization procedure and a boot-up sequence. Generally, this block makes certain system blocks invisible to the external user, as enabled by the security code.

A 32 KHz on-chip oscillator 120 operates in conjunction with a direct connection to an off-chip 32.768 KHz crystal/ and provides the reference clock to the on-chip PLLs 121a and 121b. PLLs 121a,b provide different clocks that are needed by various blocks using a set of user—programmable dividers. Additionally, built-in self-calibration circuitry allows optimization of the bias currents in order to overcome changes in the working environment. Clock control is implemented through block 122 which is the main "valve" for all on-chip clock sources. It can be configured to provide full speed or a fraction of the full speed to each clock domain, as well to gate a clock off for power saving if certain block is not used in a particular application.

Three freerunning timers 123a,c operate off APB bus 112 in support of microprocessor 101. RTC block 124 provides real time clock information for the system.

Memory Remapping 125a block a comprises 3 different memory mapping schemes for different on-chip and off-chip memory configurations.

Interrupt Controller 126 collects all interrupt sources and generates request to microprocessor 101 and/or DSP 102.

DSP 102 operates in conjunction with a DSP Peripheral Bus 127. Inter-Processor Communication (IPC) block 128 provides hardware for synchronization and message exchange between microprocessor 101 and DSP 102 via DSP Peripheral bus 127 and APB bus 112.

I2S In/Out block 129, which also operates off both APB bus 112 and DSP Peripheral bus 127, supports a 2-channel input in either I2S mode or burst mode and aa4-channel output mode. It can be used, for example, to connect to an external ADC/DAC or transport-demuxer.

Pulse width modulator (PWM) 130 provides an analog audio output requiring minimal external passive components and shares two of the four channels output from I2S output block.

DSP Timer/STC block 131 provides timer and system timing clocks to the DSP sub-system for the purpose of synchronizing DSP routines.

GFace 132 interfaces DSP 102 with main bus 102, through slave AHB/DSP interface 111, and with the DSP memory. In the illustrated embodiment, DSP 102 is associated with dedicated on-chip Program Memory 133 and two blocks Data (Data0 and Data1) Memory 134 and 135. Global RAM 136 serves the communication buffer between microprocessor 101 and DSP 102. All DSP memories 133–135 and the Global RAMa136 are mapped into the microprocessor address space so that microprocessor 101 can initialize those memories and pass data to DSP 102. Global RAM 136 is also mapped into the DSP Program/Data0/Data1 address space, for DSP access.

Figure 2:
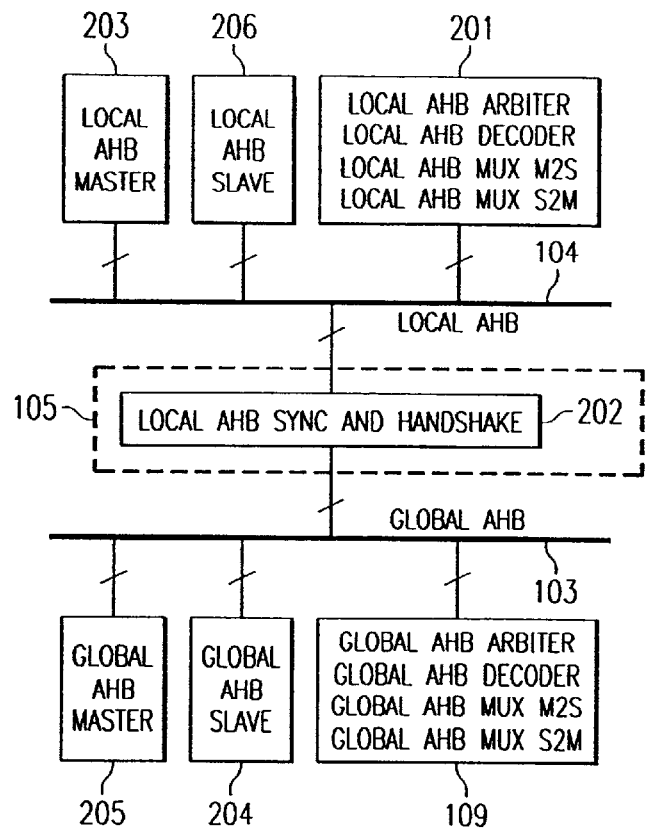
FIG. 2 is a functional block diagram illustrating the bus structure of the system depicted in FIG. 1.
Figure 3:
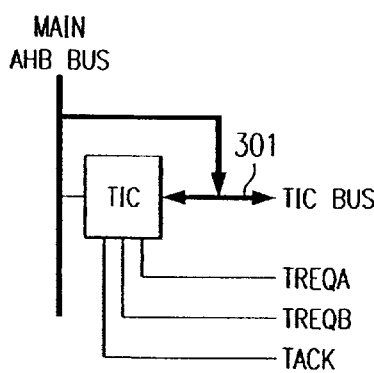
FIG. 3 is a functional block diagram of the TIC interface of the system of FIG. 1.

The preferred bus structure of system 100 is shown in FIG. 2 in additional detail. Here, a Local AHB Arbiter (Block 201) controls the arbitration between the microprocessor 101 master and a Local AHB Sync & Handshake (AHBIF) master 202, with AHBIF master 202 given the highest priority and microprocessor 101 the lowest priority when granting control of the Local AHB bus 104. If no other bus masters are requesting access to Local AHB bus 104, athen microprocessor 101 is granted the default access to the bus.

AHBIF master 202 performs synchronization and handshaking of transactions from Local bus 104 and Global bus 103 and vice versa.

If a given master on Local AHB bus 104 (shown generically by block 203) initiates a transaction to a slave on a Global AHB bus 103 (shown generically by block 204) the following operations take place:

(1) The initiating master arbitrates for the Local bus 104 and once it receives control, transmits valid transaction data and control signals;

(2) AHBIF 202 acts as a slave to the Local AHB arbiter 201, capturing the valid transaction data and control signals from the Local bus 104 and generating bus request signal to Global AHB arbiter (Block 109). A flag is also set indicating entry into a wait state for the completion of transaction by the Local AHB master;

(3) AHBIF master 201 acts as a master to the Global AHB arbiter, in this scenario, arbitrating for Global bus 103. After securing control of Global bus 103, AHBIF master transmits the captured transaction data and control signals on the Global bus 103; and (4) The target global slave 204 on Global bus 103 decodes the transaction data and control signals and indicates completion of the transaction by setting a flag. AHBIF master 202 detects the flag and in turn sets a flag to indicate completion of transaction to the Local AHB master.

If a master operating from Global AHB bus 103 (shown generically as block 205) initiates a transaction to a slave on the Local AHB bus 104 (shown generically as block 206), the following operations are performed:

(1) The given master arbitrates for the Global bus 103 and, once securing control of the bus, transmits valid transaction data and control signals;

(2) AHBIF 202 acts as a slave to Global AHB arbiter 109, capturing the valid transaction data and control signals from Global bus 103 and generating a bus request signal to Local AHB arbiter 201. AHBIF master 202 also sets a flag to indicate entry into a wait state for the completion of transaction by the Global AHB master 205;

(3) AHBIF 202 acts as a master to the Local AHB arbiter and arbitrates for the Local bus 104. After securing control of the bus, it transmits the captured transaction data and control on the Local bus 104; and (4) The target slave 206 on Local bus 104 decodes the transaction data and control signals and indicates completion of transaction by setting a flag. In response, AHBIF master 202 sets a flag to indicate completion of transaction to the given Global AHB master 205.

Deadlock situations can arise if two masters, neither of which is AHBIF master 202, have control of the Local bus 104 and Global bus 103 respectively and are attempting to access a slave on the opposite side of AHBIF master 202. Deadlocks are broken by forcing a completion of the transaction initiated by the Local AHB master with a retry response. This enables the AHBIF to become a master on the Local AHB bus and complete the transaction initiated by the Global AHB master.

AHB to DSP Slave interface 111 allows microprocessor 101 to send read and write requests to the different local memories 133–135 of DSP 102 and global memory 136. Additionally, interface 111 synchronizes the microprocessor and DSP clock domains and performs the necessary handshaking. In particular, interface 111 responds to transaction requests from the currently granted local or global AHB master 203/205. The transaction requests are then passed to GFACE 132 and the individual memory selection signals, (x_sel, y_sel, p_sel, and g_sel) decoded from the corresponding address.

AHB to DSP slave interface 111 operates between two different clock domains. Preferably, the frequency of the DSP clock domain is an integer multiple of the frequency of the microprocessor clock domain and the edges of both domains are aligned for every microprocessor clock domain rising edge. It therefore becomes necessary to prevent the microprocessor from performing multiple memory accesses during its cycle when DSP domain is based on a faster clock. Preferably, a signal is taken from the clock generator which indicates to Interface 111 the last DSP cycle before the next microprocessor clock domain rising edge. From this, a microprocessor memory access can be restricted to only on first cycle, if there is no DSP conflict, or to the second cycle if a DSP conflict occurs. All other cycles are locked to the DSP.

GFACE 132 interfaces the microprocessor 101 and DSP 102 to both the global and DSP specific memory spaces. In particular, GFACE 132 manages all accesses to these memory spaces, resolves conflicting accesses from the DSP and the microprocessor when they arise, and serializes parallel accesses to the global memory from the DSP. Generally, conflicts are resolved by extending the low clock phase of the DSP when the microprocessor and DSP both access the same memory module. For purposes of discussion, memory spaces are: x memory, y memory, program (p) memory, and global (g) memory.

When DSP 102 and microprocessor 101 attempt to access the same memory block at the same time, GFACE 132 performs the following operations:

(1) In the first system clock cycle, the DSP request is serviced.

For writes, the write information is written to memory. In the case of leads, the GFACE 132 retrieves the data from memory and stores them in an internal register;

(2) The high phase of the DSP clock is extended to 3×its normal width. During this time, in the second system clock cycle, GFACE 132 services the Microprocessor 101 request; and (3) After servicing the Microprocessor 101 request, GFACE 132 completes DSP reads by accessing the information in the read registers, and returns the DSP clock to its usual duty cycle.

A signal is provided between DSP 102 and GFACE 132 which allows the DSP to request a one cycle stretch in the memory timing. When the DSP asserts this signal, and provided that there are no conflicts on that cycle, GFACE 132 stretches both the DSP and RAM clocks. (If there is a conflict between the DSP and the microprocessor, there be no need for a stretch, because the DSP will be automatically stalled one cycle.)

In the illustrated embodiment, DSP 102 operates in conjunction three memory busses designated X, Y, and P, shown generally at 150 in FIG. 1. Notwithstanding, Global Memory 136, has only one port. Therefore, in the event that more than one of these busses attempts to access the global memory at the same time, GFACE 132 will serialize the requests to avoid conflicts. GFACE 132 also extends the high phase of the DSP clock while it performs the necessary number of accesses to global memory. Upon completing all accesses, GFACE 132 completes the DSP memory cycles, and returns the DSP clock to its usual duty cycle. If microprocessor 101 requests an access to the global memory space during this process, the DSP is backed off for an additional clock cycle for the microprocessor access.

In the preferred embodiment, GFACE 132 does not include coherency hardware and therefore, coherency is maintained in the software programming.

AHB/APB Bridge 113 spans main (global) bus 103 and APB bus 112. When any AHB bus master wants to access the address space located on APB bus, the bridge translates the signals from the AHB to the APB format, as well as re-times the signals when main bus is operating at a HCLK (high-speed clock) rate higher than that of the peripheral bus clock (PCLK).

Microprocessor 101 operates in conjunction with dedicated on-chip memory subsystem 137, which includes an 8K×32 RAM and a 6K×16 ROM connected to the local AHB bus 104. Microprocessor 101 can perform byte, half-word and word access to both the RAM and ROM sections. A wrapper 138 makes the RAM and ROM AHB compliant slave devices. Since the preferred ROM space is 16-bit wide only, when Microprocessor 101 performs a word-read, wrapper 138 issues two consecutive reads to the ROM and concatenates the two read results into a 32-bit word, which is returned to Microprocessor 101.

In order to enhance the testability and reduce the production testing time, a weak-write test circuit 139 is built in the RAM second to accelerate the RAM retention test speed The RAM can be divided into two equal size banks which can be put into weak-write mode independently, so that when one bank is in test mode and the other one can be used as scratch pad for the testing program.

TIC 108 supports debugging by Microprocessor 101, and acts as an AHB bus master with the highest priority. The TIC bus connections are shown in the block diagram of FIG. 3. When system debugging is allowed in a test or non-security mode, the TIC drivers allow access of all address-mapped registers and/or memory in the entire system for debugging purpose. When TIC mode is enabled, TIC uses 32 pins of the external memory interface as a 32-bit bi-directional data bus 301. An external clock (EXTCLKI) is used to clock main AHB bus 103, as well as for synchronizing main AHB bus 103 with the TIC bus, so that an external TIC controller is able to access the main AHB bus as a AMBA bus master through the TIC block. When TIC 100 is engaged by external TIC driver software, the user can stimulate all the Microprocessor 101 devices through TIC directly without requiring intervention by Microprocessor 101 processor.

Display interface 110 includes an LCD Display Controller which supports an interface to any one of a number of LCD displays. In particular, system 100 can drive STN (Super Twisted Nematic) display panels which have the advantage of requiring less power than similar active TFT panels. The LCD controller shares pins with the General Purpose Input/Output port 140. The integrated LCD controller of system 100 the application advantageously bridges the display resolution gap between the low end (character displays) and the high end (graphics displays) with a 320×240 type resolution.

Figure 4:
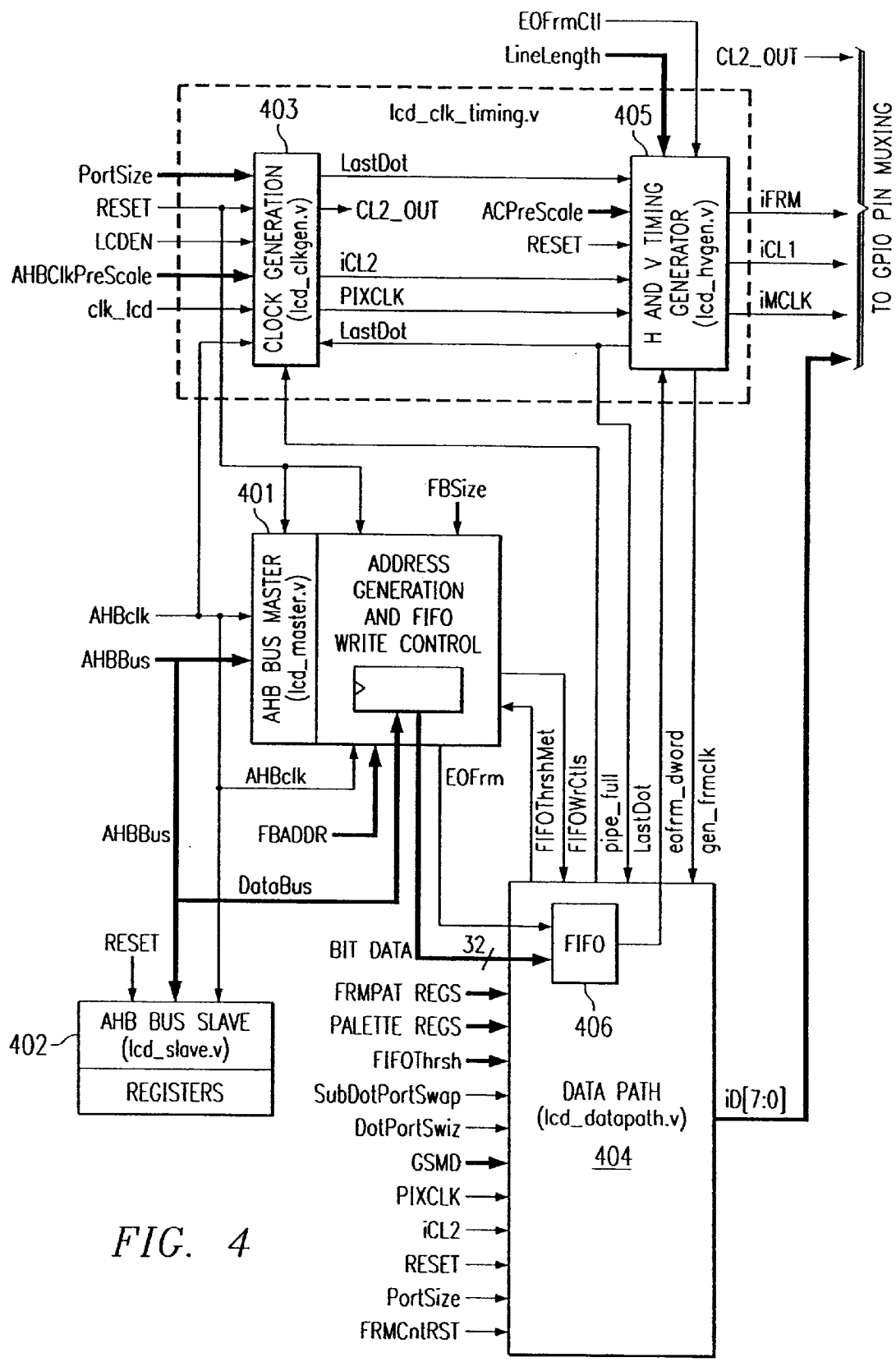
FIG. 4 is a functional block diagram of the LCD interface/display controller of the system of FIG. 1.

FIG. 4 is a functional block diagram of the preferred LCD interface/display controller 110. In this embodiment, the display interface includes both an AHB bus master 401 and an AHB slave 402 operating off main AHB bus 103.

Clock generation block 403 generates the internal pixel clock (iPixClk) by dividing down the AHBClk from bus 103 by a prescale factor selected as a function of the frame refresh rate. This clock drives the majority of the display controller logic and represents a single pixel or subpixel. The clock iCL2 is generated by dividing down the pixel clock as a function of width of the interface bus to the external device, and is used internally for such operations as data muxing iCL2 allows multiple dots to be clocked across the data bus per cycle. Clock CL2_OUT is the LCD Dot Clock clocking between one and eight dots per cycle through the external panel, and is similar to iCL2, with dead time inserted for transition of clock CL1.

Clock CL1 is the Line Latch Pulse and is generated by horizontal—vertical (H&V) timing generator 405 for one CL2 clock period at the end of a display line (as indicated by LastDot). CL1 is used to latch lines of dots into a buffer for driving the display and increments the LCD panel row driver in preparation to generate the next display line. Additionally, H&V timing generator 405 generates the LCD Frame Synchronization (FRM) and LCD AC Bias Drive signals. The FRM signal is used by the display panel to reset to row line 1 and is generated after receiving an End of Frame signal from Bus Master 401. MCLK is used to insure that the display driver voltage frequency does not fall to DC.

DATA path 404 includes a FIFO 406 which is kept filled with data from main bus 103 by Bus Master 401 (in the AHB clock domain) as a function of the programmable threshold signal FIFOThrsh. Data is read from the FIFO in the pixel clock domain as a function of the number of bits per pixel required for the external display panel. The data retrieved from FIFO is used to address a palette which supports gray scaling. Data path 404 also performs operations such as frame rate modulation, swizzle and red/blue swaps. Frame rate modulation is a technique used by LCD controllers to utilize the slow response time of the liquid crystal to produce gray shades. This method varies the duty cycle of the LCD pixels in time over multiple frames.

Figure 5:
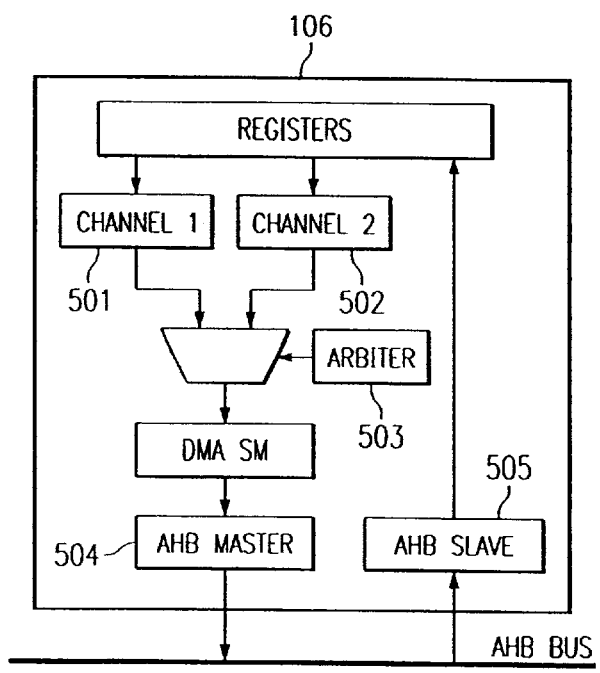
FIG. 5 is a functional block diagram of the DMA engine of the system of FIG. 1.

As shown in additional detail in FIG. 5, DMA block 106 includes 2 separate DMA channels 501 and 502, a 2-way Arbiter 503, a shared AHB bus master 504, and a shared AHB register slave 505. Each DMA channel 501/502 receives 4-bit DMA requests. The requests are issued from system resources such as USB port 114. Each DMA channel can be used independently or dedicated to any request signal.

AHB bus 103 is based on pipe-lined address and data architecture, therefore DMA transfer operations generally proceed as follows. When enabled, the given DMA channel 501/502 performs an internal request which generates an AHB bus request. When the request is granted, the appropriate DMA channel signals are routed based on internal 2-way arbiter 503 and the selected channel begins the transfer with the source location address driven on the bus during the previous data cycle. During all transfers, the individual channel asserts an internal channel lock signal to lock DMA arbiter 503 to the current channel so that the active DMA channel can complete the transfer without been interrupted. Timeouts are used to avoid any starvation, and to allow higher priority masters to assume control of AHB bus 103.

Source and destination addressing for each DMA channel can be independently programmed to increment, decrement, or stay at the same value. Generally, 32-bit source and destination address pointers in register define the DMA transfer configuration and are incremented or decremented based on the control bit configuration set in register for each channel. If the increment and decrement bits are the same value, the associated address remains the same. This configuration is used for transfers to/from I/O ports. When performing a DMA transfer of a specific length, a transfer count value of up to one less than 64K transfers is also set in register.

Unsynchronized transfers are initiated by software configuration of register bits and occur whenever the DMA channel is granted access to the bus. Synchronized transfers are DMA channel controlled by DMA requests from various resources, such as serial channel transmit or receive buffers.

Arbiter 503 follows the AMBA bus protocol to grant the bus access permission when simultaneous bus access requests are issued by different bus masters on main AHB bus 103. Again, there are total four AMBA bus masters in the System 100, and their bus access priority f highest to the lowest as follows: (1) TIC 108; (2) display interface 110; (3) DMA controller 106; and (4) Local/Main AHB Interface 105.

Figure 6:
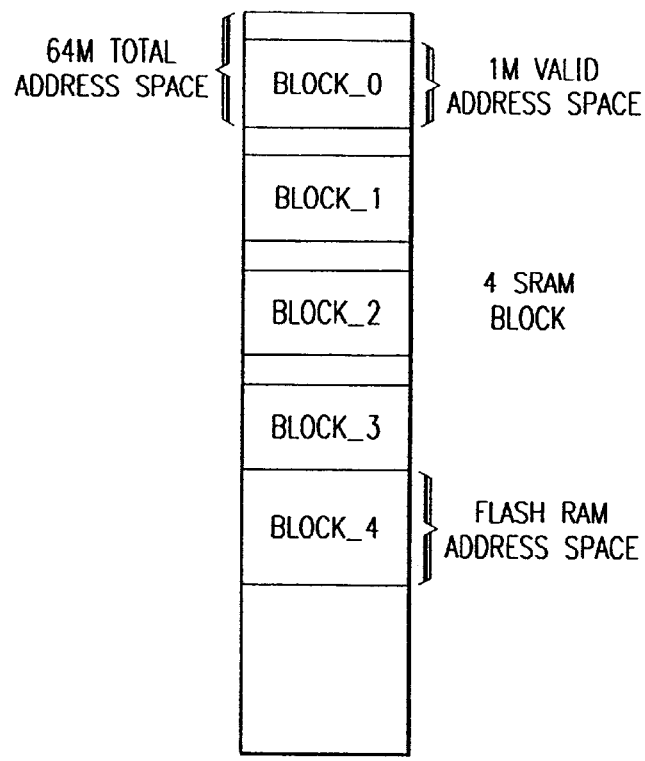
FIG. 6 is a functional block diagram of the external SRAM/Flash memory controller (SMC) of the system of FIG. 1.

External SRAM/Flash Memory Controller (SMC) 107 supports eight external memory blocks, each having an address space up to 6 M Bytes. In the preferred embodiment of system 100, 4 SRAMs blocks are used, each with 1 M-byte address space, along with one block of FLASH RAM, as shown in FIG. 6. Each Bank has its own configuration register with which programmers can configure the Bank to support a specific type of External memory. In FIG. 6, the banks designated BANK 0–3 comprise 16-bit external SRAMs and the bank designated BANK4 comprises 8-bit wide external Flash RAMs.

Figure 7:
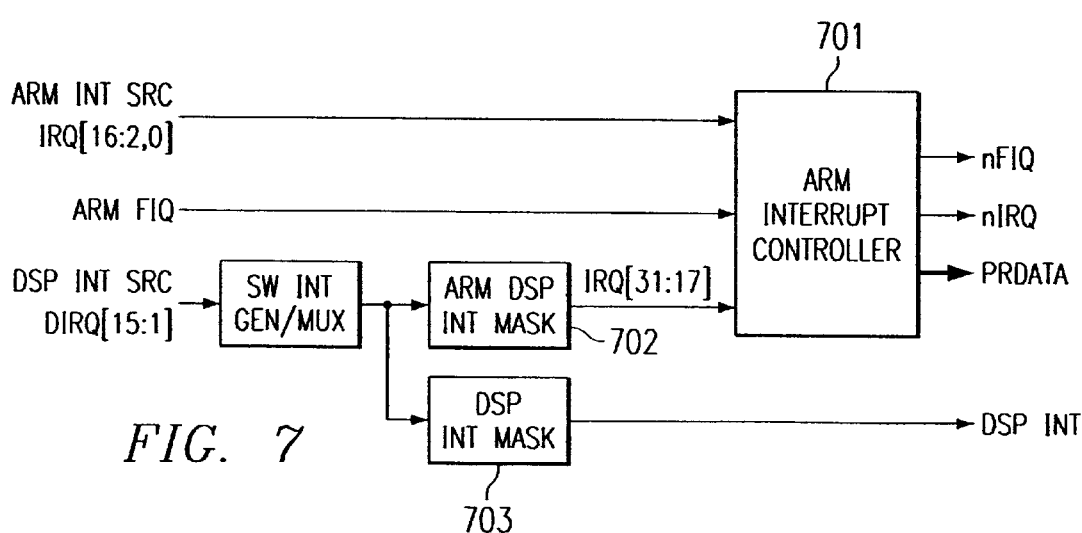
FIG. 7 is a functional block diagram of the interrupt controller of the system of FIG. 1.
Figure 8:
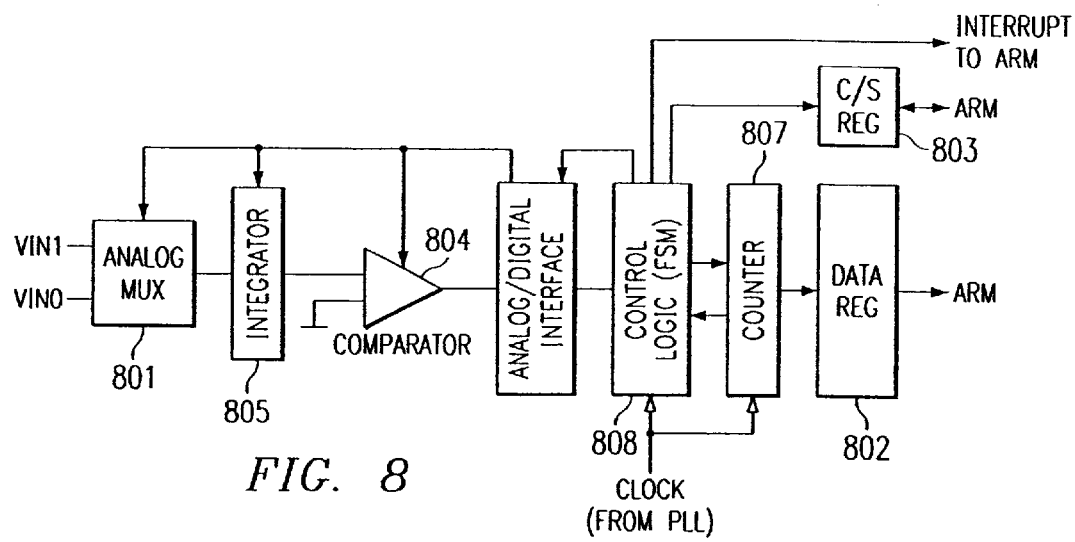
FIG. 8 is a functional block diagram of the battery checker/volume monitor circuitry of the system of FIG. 1.

Interrupt controller 126 is an APB 112 peripheral and is configured by Microprocessor 101. All the interrupts in the chip, which are level sensitive, including the DSP interrupts, pass through this block. FIG. 7 is a more detailed functional block diagram of Interrupt Controller 126 block, which is based on an ARM specified interrupt controller 701.

The size of the interrupt request space (IRQsize) is 32 in the illustrated implementation. The lower 17 interrupt sources (including IRQ1 which is a software programmed interrupt) are dedicated to a Microprocessor 101. There is no hardware priority for the Microprocessor 101 IRQs and therefore a software interrupt handler reads the source register in the Microprocessor 101 and prioritizes the asserted interrupts. The FIQ (First Interrupt Request) is generated separately fIRQs, and is also mapped to the Microprocessor 101 space only.

The DIRQs (interrupt request sources for the DSP) are mapped to the higher is IRQs. All the DSP interrupts can be generated by software f Microprocessor 101 by setting bits in register. DIRQs can be individually gated off to the Microprocessor 101 by setting the Microprocessor—DS mask register 702 and masked off from the DSP by setting the DSP in mask register 702.

Battery checker/volume monitor is preferably a Dual-Slope integrating Analog to Digital converter(ADC) with a resolution of 8 bits and a nominal sampling rate of 100 Hz. A block diagram is provided as FIG. 8. The input to the ADC comes from a 2–1 analog mux 801 selecting either the battery voltage or the volume input voltage, under microprocessor control The output data register 802 is a 32-bit register which shows the value of the current sample in counter 807, with the higher 24 bits set to zero. Output register 802 is updated at each sample period and an interrupt to the microprocessor is generated when the data is ready. Dual-Slope integration and A/D conversion is based on a conventional integrator 805 and comparator 804. Enablement, configuration and status data are implemented by configuration/status register 803 within the Microprocessor 101 space under control of logic 808.

Figure 9:
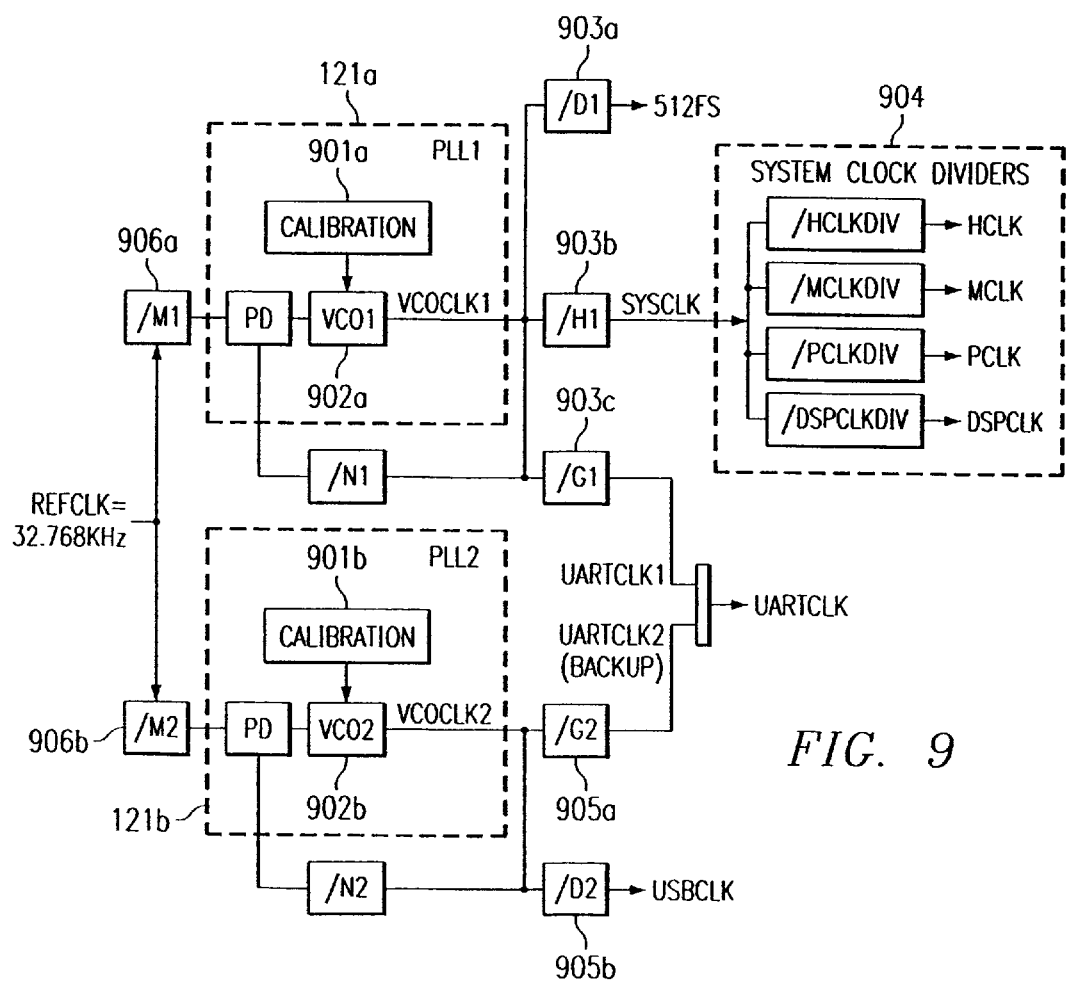
FIG. 9 is a functional block diagram of the clock generation circuitry of the system of FIG. 1.
Figure 10:
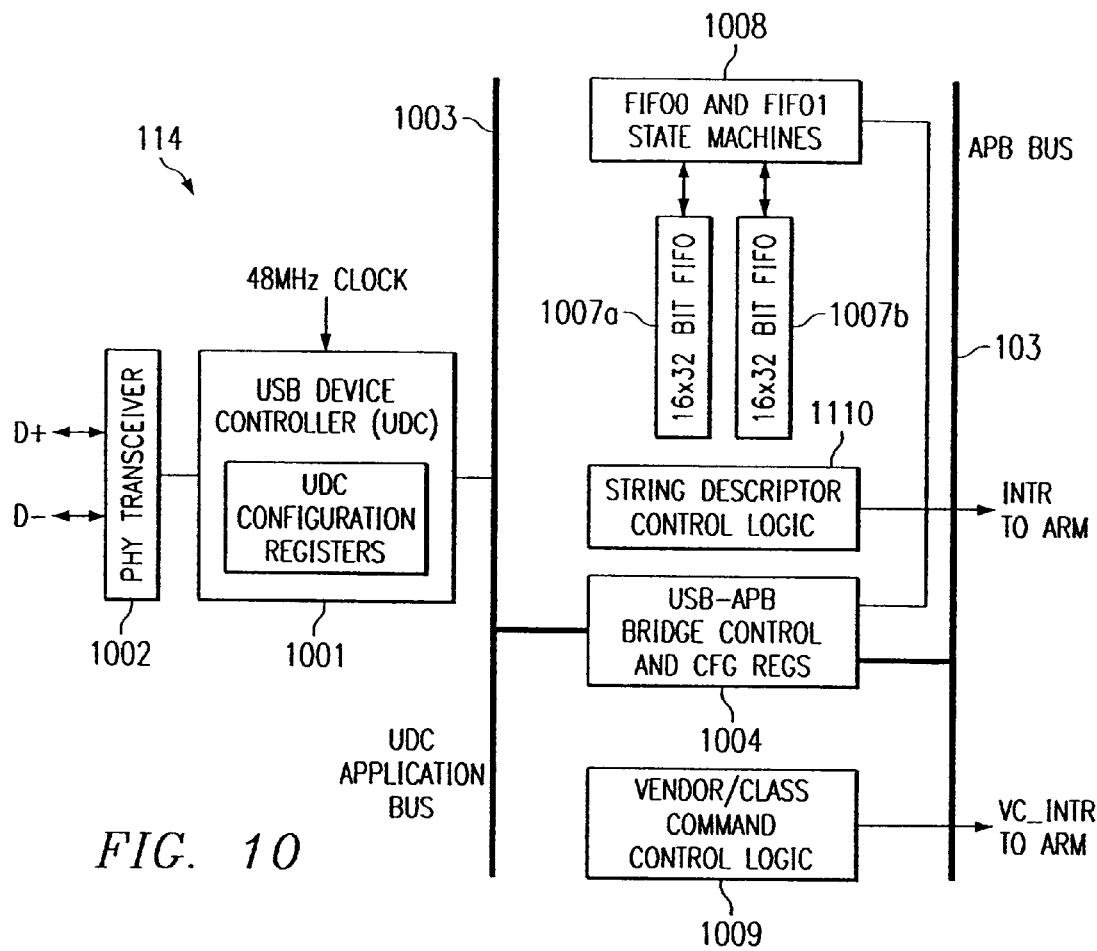
FIG. 10 is a functional block diagram of the USB port of the system of FIG. 1.

System 100 has two identical PLLs 121$a,b$ on-chip which generate all needed clock frequencies for operating the processors, setting the audio sample rate and clocking the peripherals. A block diagram of the system clock generation scheme is illustrated in FIG. 9.

Both PLLs 121$a,b$ use the on-chip 32.768 KHz oscillator 120 as reference clock. Each PLL 121$a,b$ includes a calibration circuit 901 which can set the bias current to the corresponding VCO 902$a,b$ to account changes in working environment such as temperature and supply voltage.

Preferably, the first PLL (PLL1) is used to generate the oversampled audio frequency (512FS), the system clock SYSCLK, and the UART clock using dividers 903$a,c$ set with divisors D1, H1, and G1. SYSCLK is further divided down by system clock dividers 904 to generate the base clocks HCLK (high-speed bus clock), MCLK display clock, PCLK (peripheral clock) and DSPCLK display clock. The second PLL (PLL2) is used to generate the USB clock and a backup UART clock. PLL2 is associated with dividers 905$a,b$ which generate these clocks by dividing-down by the PLL outputs by factors G2 and D2. Prescalers 906$a,b$ dsupport division of the reference clock by the values M1 and M2 prior to the inputs of PLLs 121$a,b$, respectively.

The following tables show the supporting frequencies and corresponding configurations of these two PLLs.

| SUPPORTING FREQUENCY AND DIVIDERS FOR PLL1 | | | | | | | | | | | |
|---|---|---|---|---|---|---|---|---|---|---|---|
| f_ref (KHz) | f_vco (MHz) | f_PD (KHz) | f_512FS (MHz) | FS (KHz) | f_UARTCLK1 (MHz) | f_SYSCLK (MHz) | M1 | N1 | D1 | G1 | H1 |
| 32.768 | 147.456 | 32.768 | 24.576 | 48.000 | 3.6864 | 73.728 | 1 | 4500 | 6 | 40 | 2 |
| 32.768 | 158.073 | 32.768 | 22.582 | 44.105 | 3.6761 | 79.037 | 1 | 4824 | 7 | 43 | 2 |
| 32.786 | 147.456 | 32.768 | 16.384 | 32.000 | 3.6864 | 73.728 | 1 | 4500 | 9 | 40 | 2 |

| SUPPORTING FREQUENCY AND DIVIDERS FOR PLL2 | | | | | | | | | | | |
|---|---|---|---|---|---|---|---|---|---|---|---|
| f_ref (KHz) | f_vco (MHz) | f_PD (KHz) | f_512FS (MHz) | FS (KHz) | f_UARTCLK2 (MHz) | F_USBCLK (MHz) | M2 | N2 | D2 | G2 | H2 |
| 32.768 | 48.005 | 32.768 | N/A | N/A | 3.6927 | 48.005 | 1 | 1465 | 1 | 13 | N/A |
| 32.768 | 47.972 | 32.768 | N/A | N/A | 3.6902 | 47.972 | 1 | 1464 | 1 | 13 | N/A |
| 32.768 | 47.940 | 32.768 | N/A | N/A | 3.6877 | 47.940 | 1 | 1463 | 1 | 13 | N/A |

MCLK/HCLK/PCLK/DSPCLK frequencies

| f_SYSCLK (MHz) | Divider Value (MCLKDIV/HCLKDIV/ PCLKDIV/DSPCLKDIV) | Frequency (MHz) (f_MCLK/f_HCLK/ f_PCLK/f_DSPCLK) |
|---|---|---|
| 73.728 | 1 | 73.728 |
| 73.728 | 1.5 | 49.152 |
| 73.728 | 2 | 36.864 |
| 73.728 | 3 | 24.576 |
| 73.728 | 4 | 18.432 |
| 73.728 | 5 | 14.745 |
| 73.728 | 6 | 12.288 |
| 73.728 | 7 | 10.533 |
| 73.728 | 8 | 9.216 |
| 79.037 | 1 | 79.037 |
| 79.037 | 1.5 | 52.691 |
| 79.037 | 2 | 39.519 |
| 79.037 | 3 | 26.346 |
| 79.037 | 4 | 19.759 |
| 79.037 | 5 | 15.807 |
| 79.037 | 6 | 13.173 |
| 79.037 | 7 | 11.291 |
| 79.037 | 8 | 9.880 |

Clock control block 112 contains the registers required to set the divisors and other operational parameters for the PLLs.

I2C Interface 118 performs two primary functions, namely that of an I2C configuration interface that activates on chip startup, and that of a general purpose serial interface for operating either I2C devices or similar 2 and 3 wire serial devices.

The preferred implementation allows connection to an external serial EEPROM containing power-up configuration information, as may be required for a given system configuration. After a hardware reset, a state machine attempts to load the configuration data, and if present, the first 40 bytes of configuration data are transferred to a set of on-chip configuration registers. If the EEPROM device is not present, or the header is invalid, the Configuration Registers are left in their previous state. The EEPROM device is accessible to the host processor by reading/writing to control registers.

In the general purpose control interface mode, I2S interface can be used for general purpose I/O. Each pin is controllable as an input or an output, and under software control, can implement various of serial interfaces. For example, interface 118 could be configured to communicate with external power control devices, such as those used to control Flash EEROM programming voltage, and the PCM-CIA interface operating voltage.

USB port 114 in the illustrated embodiment complies USB Specification Revision 1.1. Its primary purpose is to down-load and/or up-load music files from a host PC with Internet access. This USB device port generally is self-powered and supports 64-byte/packet bulk-in and bulk-out modes, as well as vendor/class custom commands. Since the device uses Bulk transfers, it is a Full Speed Device (12 MBps). A general block diagram is provided in FIG. 10.

A USB Device Controller (UDC) 1001 interface with an external USB compliant device through transceiver 1002 and with main bus 103 through UDC bus 1003 and USB— AHB bridge 1004. Bridge 1004 is configured using dedicated control and configuration registers and spans buses 103 and 1003. A pair of FIFOs 1007a,b and associated state machine 1008 support bulk transfers, where one FIFO can hold a packet of data while the other is exchanging data with the microprocessor.

USB port 114 can operate in either Configuration 0, where the control endpoint is for standard commands or Configuration 1, where the control endpoint is for Vendor/Class commands. String Descriptor Control Logic 1110 decodes string commands in the standard configuration. Vendor/Class commands are not decoded, but instead are stored and an interrupt to microprocessor 101 by Vendor/Class Control Logic. Subsequently, microprocessor 101, under software control, decodes Vendor/Class commands.

Microprocessor 101 includes embedded IEEE standard boundary scan circuitry (JTAG). With the supporting driver software, JTAG allows user to view the microprocessor internal state, set break points from the main application, apply special vectors, among other things.

Figure 11:
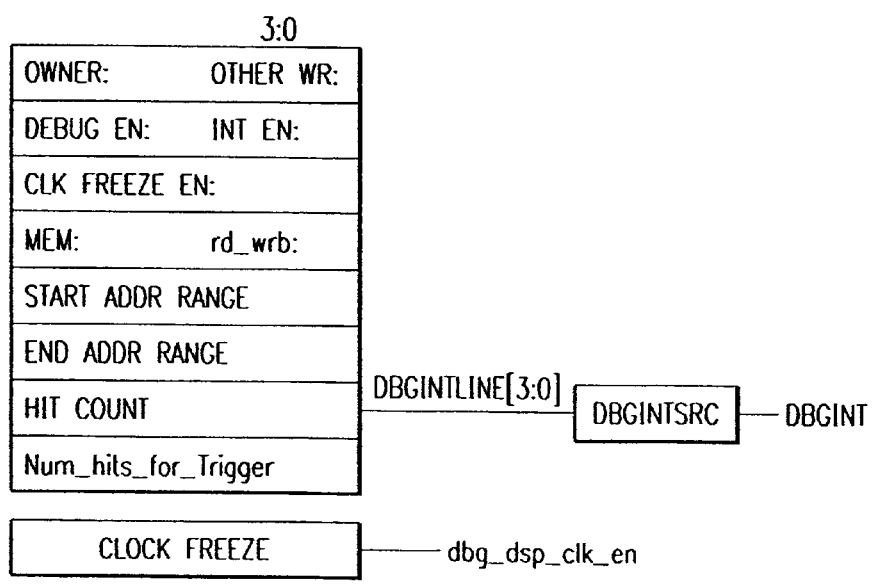
FIG. 11 is diagram of an exemplary DSP debug block.

DSP debug block 141 in the illustrated embodiment comprises sub-blocks, each of which can monitor the X/Y/P DSP memory address buses, assert an interrupt to Microprocessor 101 or DSP 102, or freeze the DSP clock, if freeze is enabled. One of these sub-blocks is shown in FIG. 11.

Each of the debug sub-block has a 1 bit read only "owner" field. When this bit is "0" the owner of this block is Microprocessor 101 and when this bit is "1" the owner is DSP 102. The owner can write to the "Other Wr" field which, if set, allows the other processor to write to the remaining fields of the debug block. The "Debug En" field is set before the actions of the debug block become effective and is also used to save power when this block is not in use. The "Clk Freeze En" is a 1-bit field which when set at the trigger of a debug event freezes the DSP clock. "Mem" is a 2 bit field which selects memories to be observed for debug event. Start address range and end address range are set, so that when the address is between these ranges an event triggers. The "Hit Count" tracks the number of times a debug event has occurred. Num_hits_for_trigger is the field which sets the number of hits to the address range before the interrupt is enabled or clock is frozen.

Debugging DSP peripherals is supported through DSP Debug block 141, since all these peripherals are mapped into DSP peripheral space.

Inter-Processor Communication block 128 allows Microprocessor 101 and DSP 102 to exchange messages and synchronize and schedule tasks. Communications are mainly defined at system (software) implementation level as a two-way interrupt driven scheme. The hardware of this block provides a number of interrupt sources from DSP to Microprocessor 101. (Microprocessor 101 interrupts DSP 102 through Interrupt Controller, as previously described.) The content of the interrupts will be determined by system applications.

Figure 12:
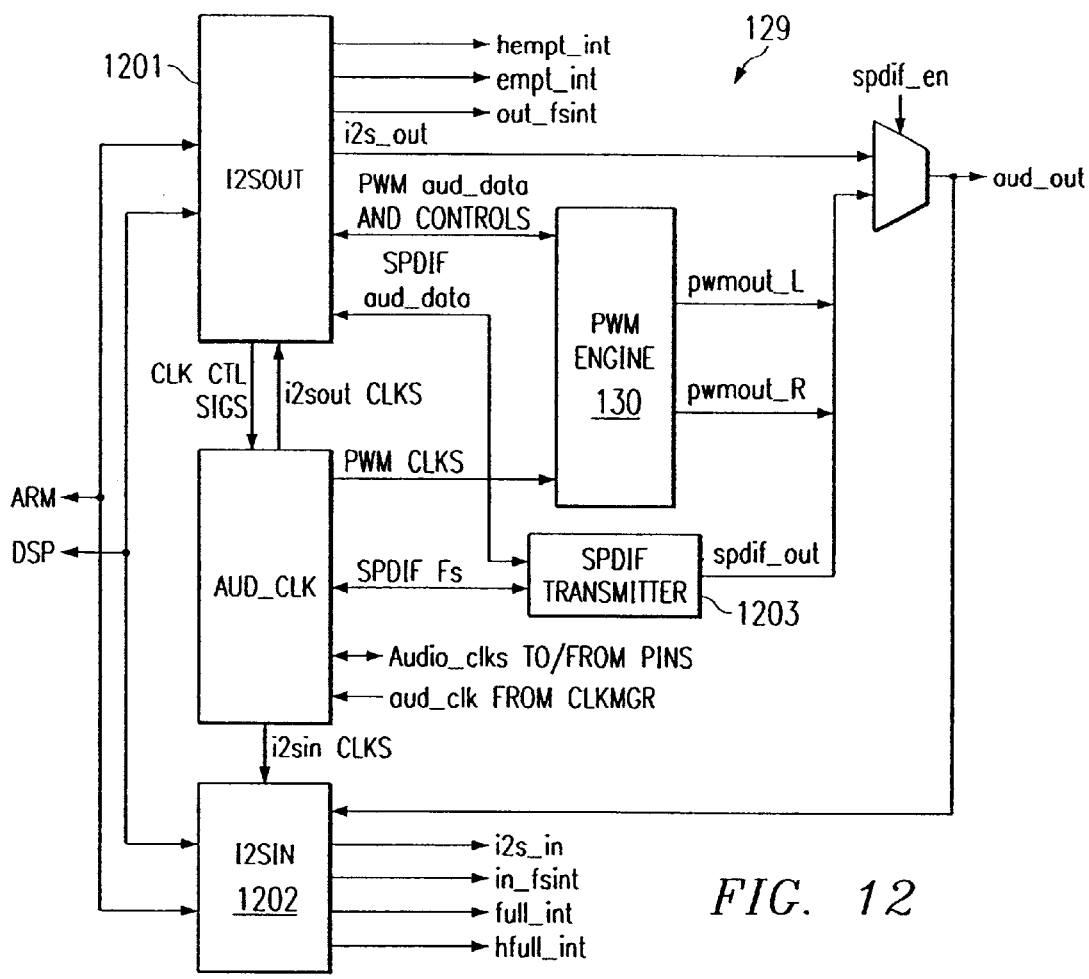
FIG. 12 is a functional block diagram of the digital audio input/output port of the system of FIG. 1.
Figure 13:
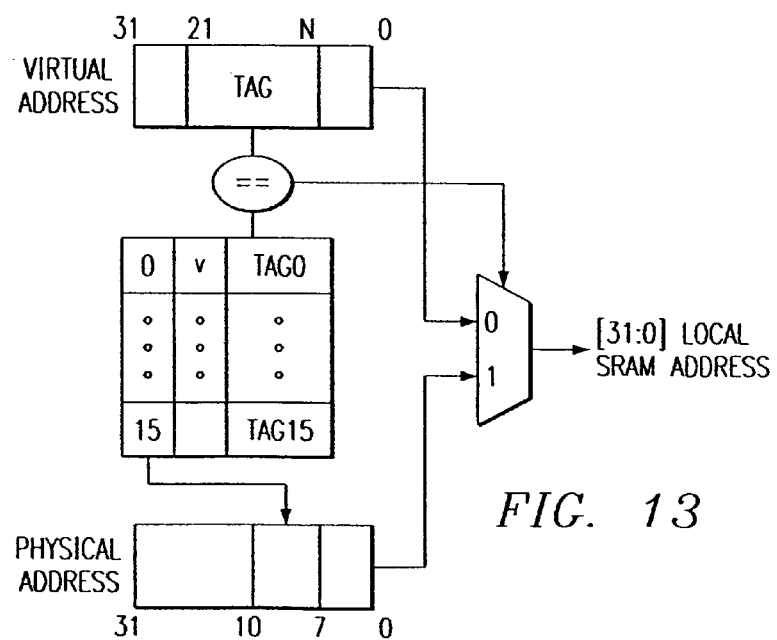
FIG. 13 is a diagram generally describing a soft cache system suitable for use in the system of FIG. 1.

Digital Audio Input/Output 129 is shown in further detail in FIG. 12. This block provides audio data input/output through two primary sub-blocks I2SOUT 1201 and I2SIN 1202.

I2SOUT 1202 drives the audio output data pin (Aud_out) and also provides audio data and controls to PWM 130 and S/DFIF transmitter 1203. In the preferred embodiment, four output channels are supported through four FIFOs each 16 entries deep and 24 bit wide. Channel configuration is implemented in registers read and writeable by Microprocessor 101 and/or DSP 102. ISOUT block 1202 can generate interrupts to the controlling microprocessor DSP when its FIFO is empty or half-empty such that the FIFO can be refilled.

SPDIF transmitter 1203 transmits serial audio data from Ch_0 and Ch_1 in SPDIF format through aud_out pin and can be used along with PWM engine 1204 and I2SIN block 1203. Either SPDIF transmitter 1203 or I2SOUT 1201 can be used at one time.

I2SIN block 1202 receives audio input data in either two formats: serial data synchronized by an LR/SCLK clock or a bit stream in a burst mode without synchronization to an LRCLK. The synchronized data can be either uncompressed PCM or compressed bursty data and the unsynchronized data can be bursty compressed data. This block takes SCLK and LRCLK from I2SOUT block 1201. In the illustrated embodiment, I2SIN port 1202 consists of two channel FIFOs, each 16 entries deep and The channel configurations are specified in register. This block generates interrupts when its FIFO is either half-full or full to the controlling microprocessor or DSP to sequence data exchanges.

PWM block 130 generates left and right channel pulse width modulated (PWM) data for driving external headphones or speakers through the Aud-out port.

System 100 has total 32 general purpose I/O (GPIO) pins which are multiplexed with other functional pins and accessible to Microprocessor 101. The GPIO functions are shown generally at block 140 in FIG. 1 and in further detail in FIG. 13.

The 32 GPIO 1301 pins in the illustrated embodiment can be controlled by Microprocessor 101 individually through APB interface 1302. Each GPIO pin can generate an interrupt request to the Microprocessor 101, if selected to do so. Specifically, interrupt block 1303 generates one interrupt request in response to one of four events defined in register occurs at any GPIO pins. An additional register acts as global interrupt enable bit for GPIO and individual pin selection is made through a mask register.

Security Fuse block 119 contains 256 fuses which give a unique ID for each chip. When the fuses are blown, a flag enables internal security ROM. Meanwhile, a Hamming Code is generated by hardware based upon the 256-bit fuse value for error concealment and correction. The fuse value is read-able by security code only when the fuse is programmed (blown). Depending on the fuse programming, different Microprocessor 101 ROM segments are mapped to Microprocessor 101 address location 0 for boot-up. The internal 12 K-byte Microprocessor 101 ROM contains three different segments: 1 Kbyte Security code, 1 K-byte alternative code, 10 K-byte normal code.

RAM test block 139 contains a weak write controller which can put the RAM in a weak write test mode. In System 100, for the purpose of weak write test, the RAM is divided into high and low banks. Similarly, DSP RAM test block 144 includes a weak write controller for testing the integrity of the DSP RAM.

Security Gates/Access Protection block 142 provides access protection when the security fuses are programmed. In the preferred embodiment, access permission is granted under the following conditions:

(1) When the fuses are not programmed (non-security chip), access protection is not engaged at any time;
(2) When the fuses are programmed, (security chip), access protection is engaged as default;
(3) Microprocessor 101 is allowed access to the protected areas only in supervisor mode when the protection is enabled;
(4) Microprocessor 101 is allowed access to the protected areas in either supervisor or user mode when the protection is disabled;
(5) The protection can be disabled by Microprocessor 101 in supervisor mode only;
(6) In the security mode TIC operations are not allowed and only Microprocessor 101 can enable the DMA and LCD; and
(7) The protection mode registers can be modified by Microprocessor 101 only in Privilege Mode.

System 100 operates in conjunction with a "soft cache system" that supports microprocessor 101 designs which do not include a hardware cache and/or memory management unit (MMU). For example, in the preferred embodiment of system 100, an ARM7tdmi microprocessor is used in microprocessor core 101. This particular microprocessor does not include either a hardware cache or MMU.

The present inventive soft cache system supports "ease of use" software development models formerly only available on fully hardware cached processor-based systems. Additionally, this soft cache system extends the available location of executable code to block based and serial based memory structures like NAND Flash, MMC, and the like.

Historically, embedded DSPs and uncached CPUs have either run code directly out of external parallel memory (DRAM, SRAM, NOR FLASH) or out of internal SRAM/FLASH. With respects to running code from external parallel memory, CPU speed and power are adversely impacted. On the other hand, internal SRAM/FLASH memory is typically significantly smaller thereby forcing direct memory management during code development to insure proper paging. In particular, all routines must fit within certain footprint guidelines to allow paging and concurrent operation. In certain applications where all of the code is developed in assembly language, this restriction can be addressed; however, using a higher level languages like "C" for fast code development, the problem is difficult, if not impossible, to solve.

Block based and serial based memories also require very different optimization of the caching and/or paging schemes. For example, often these protocols require reading of 512 byte blocks of information and the performance of error correction to extract the necessary data. In any event, there are many existing protocols and new protocols are continuously being developed, which renders the implementation of hardwired support inflexible.

As discussed further below in detail, the present soft cache system solves these problems for low-performance code. Among other things, a hardware assist is provided to manage existing generic on-chip SRAM as a cache. Additionally, the combination of less than 1000 gates and a software abort handler provide a means of managing code residing in NAND Flash as directly executable. Moreover, this cache mechanism is optimized for slow rate memories with lines size programmable at 128, 256, 512, and 1kbytes per line and uses 16 way set associative logic to provide 16 lines of cache space within the local SRAM.

The soft cache system preferably uses external SRAM for storing code and on-chip memory for data constants or other secure information. In the illustrated embodiment, a virtual (soft cache) memory space of 2 Mbytes of external and internal SRAM is dedicated to soft cache, although the size, as well as the location in memory, are not critical and can change in actual implementations.

The software cache is set-up as a 16-way set associative system, with each set associated with a single cache line in the soft cache memory space. Each set of the 16 sets is represented in register by an entry including a tag field and a validity bit. The cache line size is programmable to 128, 256, 512 or 1024 bytes. Each cache line space is addressable by the N lower order virtual (CPU) address bits N−1:0, where N is 7, 8, 9 or 10, depending on whether the cache line size is 128, 256, 512, or 1024 bytes, respectively. Bits 21:N of the virtual address then represent a cache tag. The remaining bits 31:22 are the block address to the assigned memory block, which could be controlled by hardwired logic. Hardware comparators compare the tag field of each CPU address generated with tag fields stored in the soft cache registers.

Figure 14:
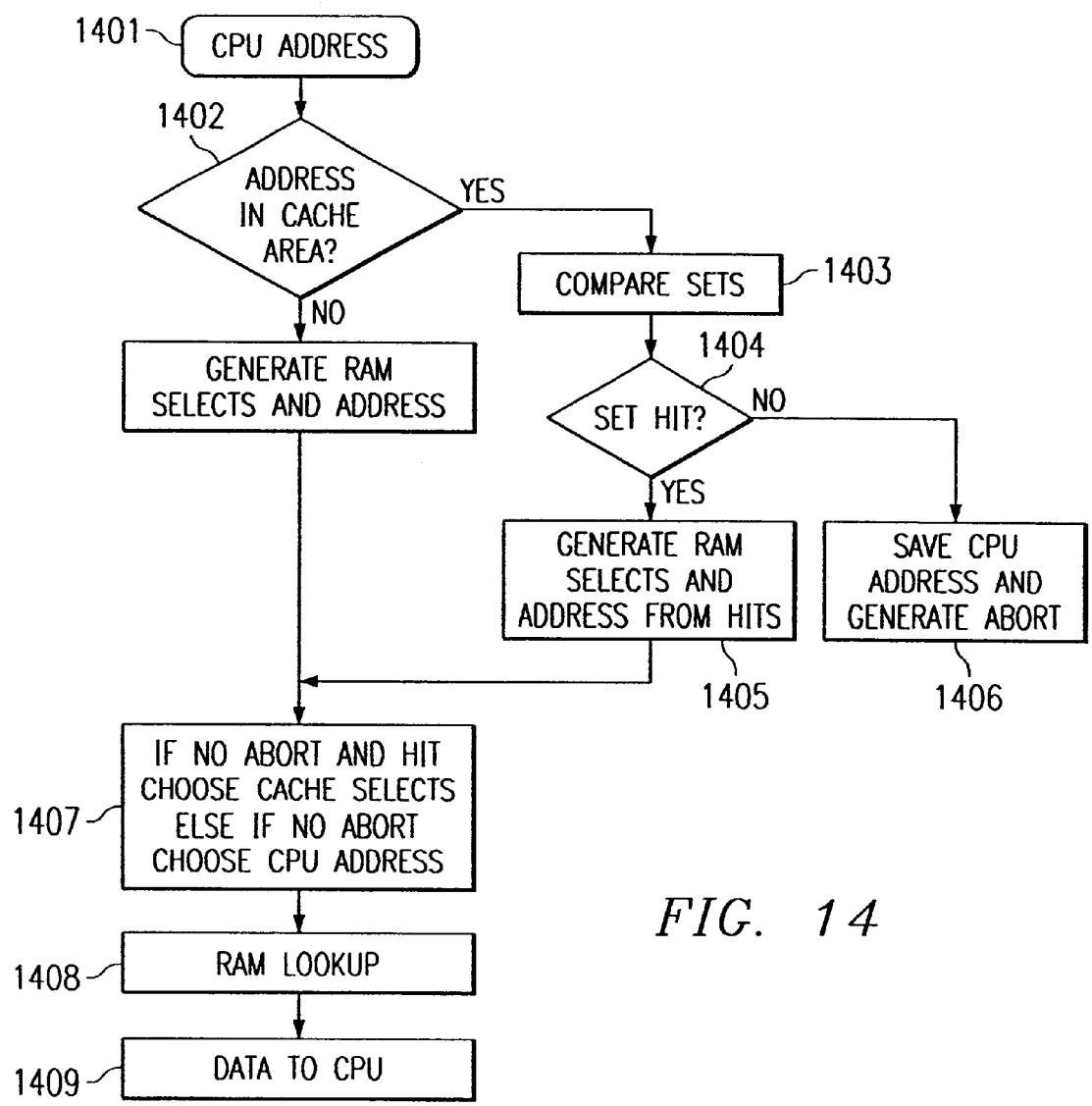
FIG. 14 is a flow chart of illustrating the operation of the soft cache system of FIG. 13.

A soft cache operation is illustrated in the flow chart of FIG. 14.

At Step 1401, an virtual (CPU) address is generated by microprocessor 101, which are then checked at Step 1402 to determine whether its block address is within the soft cache address space. The case where the virtual address is within the soft cache address space will be considered first.

The cache tag from the virtual address is compared with the tag fields in the corresponding 16 register entries by the hardware comparators at Step 1403. If a match occurs, the index corresponding to the matching entry in soft cache is taken for use in generating a physical address to the appropriate location in the soft cache memory block. For a 16-way cache system, the entries are indexed with four bits from 0 to 15. In an embodiment where the soft cache address space starts at 0000 and works upward, bits N−1:0 of the CPU address become bits N−1:0 of the physical address and address the location in the cache line. The 4-bit index from the matching soft cache entry replaces bits N+3:N of the physical address and operates as an offset which selects the proper cache line. The remaining bits (31:N+4) come from the virtual address and are used for RAM bank, block and chip select. The required read or write to the addressed area in the soft cache memory space subsequently takes place.

For example, assume that the cache line size is programmed to be 256 bytes. In this case, N=8. Bits 21:8 of the CPU address are therefore compared with the cache tags in the table entries. Also assume that a hit occurs to entry #5 and the corresponding 4-bit index is 5. For simplicity, the soft cacheable block of memory will have an arbitrarily selected starting address of 0. The physical address (in hex) is therefore 000005CC, where CC are bits 7:0 of the CPU address to a location within cache line 5.

Note that the soft cache area in memory could start at a given address, for example 7fff, and work downward. In this case, bits 14:N are modified based on cache size. This scheme insures that location 0000, which maintains the interrupt vectors, does not become part of the cache.

Next consider the case where a cache miss occurs during comparison Step 1403. A hardware soft cache history register is maintained which tracks the last four hits (matches). Preferably, this register is a shift register which shifts in the 4-bit index from each matching entry, if that index differs from the index of the previous matching index. In other words, if two consecutive indices are the same, no shifting takes place such that no two consecutive indices in the shift register are equal. This register improves the performance of the software replacement handler invoked on a cache miss.

On the miss, a soft cache abort is signaled to microprocessor 101 by setting an Abort Status bit in register. (This bit is cleared automatically after being read). The address causing the cache miss (abort) is written into an Abort Address register. Setting the Abort Status bit initiates the replacement handler routine.

The replacement handler routine selects the cache line to be replaced based on the contents of the history register. For example, the cache line replaced can be one of those not corresponding to the four indices stored in the history register. The required data is fetched from its current location in memory, using the address in the Abort Address register and loaded into the selected cache line, and the cache tag in the corresponding cache entry is updated. The source location could be in NAND or serial flash and the software handler is capable of performing the specific access procedures normally required for these types of memory. To implement this memory, the DMA engine and other system resources are invoked as required. Once the data has been encached and the cache tag updated, the instruction causing the cache miss can be successfully reissued.

In the case where the CPU address is not within the soft cache address space and no abort has occurred, then the CPU address is used as the physical address to the RAM (Step 1407).

At Step 1408, the physical address is used to access the addressed RAM space. The data is exchanged with the CPU at Step 1409.

One exemplary use of present soft cache is in digital audio player applications of system 100. For example, all low-performance code can run directly thru the soft cache with only the high performance code (USB, Audio Decoder, and Interrupt Handlers) being managed directly by the programmer.

In sum, the inventive concepts provide a mechanism for encaching data in devices and systems which have limited or no hardware caching capability. Moreover, since replacement of a cache misses is performed in software, an efficient interface can be established with memories which have specific access protocols, such as the NAND flash memories typically used in MPEG 3 music systems.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A soft cache system performing the operations of:
  comparing tag bits of a virtual address with tag bits programmed in a plurality of register entries, each entry associated with an index to a cache line of programmable cache line size in virtual cache space, the virtual cache space location in memory space programmed by a block address portion of the virtual address and the cache line size programmed by a field in the virtual address;
  when the tag bits of the virtual address match the tag bits of one of the programmable register entries, selecting the index corresponding to said entry for generating a physical address; and
  generating the physical address using the selected index as an offset to the cache line and the block address from the virtual memory as an address to the virtual cache space; and
  when the tag bits of the virtual address do not match the tag bits of one of the register entries:
    selecting a cache line in the virtual cache space for encaching data associated with the virtual address;
    retrieving the data associated with the virtual address from a second area of memory using the virtual address;

encaching the data retrieved from the second area of memory in the selected cache line in the virtual cache space; and updating the tag bits in the register associated with the selected cache line.

2. The soft cache system of claim 1 wherein the cache line size is programmable to be M number of locations and the virtual address includes log2M number of bits indexing the M number of cache line locations.

3. The soft cache system of claim 2 wherein the M number of locations comprise byte locations.

4. The soft cache system of claim 3 wherein the cache line size is selected from the group consisting of 128, 256, 512, and 1024 bytes.

5. The soft cache system of claim 1 wherein the cache system comprises an X-way set associative system having X number of register entries storing log2X number of tag bits.

6. The soft cache system of claim 5 wherein the cache system comprises a 16-way set associative system and the plurality of register entries each store 4 bits.

7. A method of data caching comprising the steps of:

setting up an M-way set associative cache comprising a register having M number of corresponding entries each storing a tag value and indexed to a cache line in a selected cache area in memory;

setting a cache line size for the cache lines, the cache tag value selected as a function of the selected cache line size;

generating a virtual address including a tag field, a cache line address field addressing locations within the cache line size and a block address field addressing the cache area in memory;

comparing the tag field of the virtual address with the tag values in the cache;

when the tag field of the virtual address matches a tag value in the cache, generating a physical address to the corresponding cache line with the index associated with the register entry containing the matching tag value and the cache line and block address fields from the virtual address;

updating a history register with the index associated with the matching tag value; and when the tag field of the virtual address does not match a tag value in the register, accessing a corresponding area in memory with the virtual address;

selecting a replacement cache line from the cache area in memory from information stored in the history register;

transferring data from the corresponding area in memory accessed with the virtual address to the replacement cache line in the cache area of memory; and updating the register entry associated with the index to the replacement cache line with the tag from the virtual address.

8. The method of claim 7 wherein said step of updating the history register comprises the step of shifting an index into a shift register.

9. The method of claim 7 wherein said step of updating the history register comprises the step of storing a plurality of non-identical indices.

10. The method of claim 7 wherein said step of setting up a cache comprises the step of setting up a hardware register having a plurality of entries for storing a tag value and indexed to a cache line.

11. The method of claim 7 further comprising the steps of:

determining if a block address field of the virtual address corresponds to the cache area in memory; and addressing the memory with the virtual address if the block address of the virtual address does not correspond to the cache area in memory.

12. The method of claim 7 wherein the cache area in memory comprises an area in random access memory.

13. The method of claim 7 wherein the cache area in memory comprises an area in FLASH memory.

14. A system comprising:

a central processing unit;

a memory including a soft cache space; and a soft cache system for accessing data in the soft cache space at a programmable location within memory space in response to addresses from the central processing unit including:

a register having a plurality of entries each for storing a cache tag and indexed to a cache line in the soft cache space, the cache line having a programmable cache line size;

a plurality of comparators for comparing a tag field of an address from the central processing unit with cache tags stored in each of the entries of the register;

circuitry for generating an address to the soft cache space when the tag field matches a cache tag in the register using the index associated with the entry storing the matching cache tag and selected bits from the address from the central processing unit addressing the soft cache space; and circuitry for updating data within the soft cache space when the tag field does not match the cache tag in the register and operable to select a cache line in the soft cache space for encaching data associated with the address from the central processing unit, retrieve the data from a second area of the memory space using the address from the central processing unit, encache the data from the second area of the memory space in the selected cache line, and update the cache tag in the register associated with the selected cache line.

15. A system of claim 14 wherein said central processing unit comprises a portion of a system on a chip.

16. The system of claim 15 wherein said memory forms part of said system on a chip.

17. The system of claim 15 wherein said memory is external to said system on a chip.

18. The system of claim 14 wherein said central processing unit and said memory form part of a portable audio system.

* * * * *